United States Patent [19]

Kwon et al.

[11] 4,327,318
[45] Apr. 27, 1982

[54] SOURCE SHEDDING REGULATOR

[75] Inventors: Yiduk Kwon, Bedford; Paul Lawson, Hopedale, both of Mass.

[73] Assignee: Exxon Research & Engineering Co., Florham Park, N.J.

[21] Appl. No.: 202,544

[22] Filed: Oct. 31, 1980

[51] Int. Cl.³ ............................. G05F 1/46; H02J 7/04
[52] U.S. Cl. ........................................ 320/39; 320/61; 323/906
[58] Field of Search ........................................ 320/2-5, 320/39, 40, 61; 323/906

[56] References Cited

U.S. PATENT DOCUMENTS 3,600,599  8/1971  Wright ................................. 323/906
3,896,368  7/1975  Rym ..................................... 323/906
4,186,336  1/1980  Weinberg ............................ 323/906

OTHER PUBLICATIONS

R. N. Cadieux, for the Department of Energy Under Contract No. EY-76-C-02-4094 Entitled Battery Charde/Solar Array Controller for a Residential-Size Photovoltaic Power System.

Primary Examiner—Robert J. Hickey
Attorney, Agent, or Firm—Paul E. Purwin

[57] ABSTRACT

A voltage regulator for controlling the photovoltaic charging of storage batteries selectively includes or sheds portions of the photovoltaic array into or from the charging system.

14 Claims, 5 Drawing Figures 4,327,318

SOURCE SHEDDING REGULATOR

BACKGROUND OF THE INVENTION

The present invention relates to voltage regulators for photovoltaic charging systems and in particular to a sequential switching regulator for selectively shedding and reinserting portions of a photovoltaic array into a storage battery charging system.

Solar photovoltaic systems are conventionally arranged to supply charging (or recharging) power to storage batteries, such as rechargeable lead-acid or nickel cadmium battery systems. As a conventional battery is recharged, the terminal voltage of the battery gradually rises. The terminal voltage continues to rise corresponding to the amount of energy supplied to the battery. Even after the storage battery has reached full charge, the terminal voltage may continue to rise until the voltage reaches the gassing potential (lead-acid battery) of the electrolyte. If a charging voltage above the gassing potential is maintained, the storage battery will lose its electrolyte deteriorating battery output, and possibly destroying the storage battery. This situation is typically avoided by interposing a voltage regulator between the photovoltaic array and the storage battery. When the storage battery is fully charged, the regulator serves to shunt charging power from the battery. The regulator normally shunts the array's entire charging capability, which requires that the regulator's power dissipating device(s) handle the entire array electrical load. To overcome these and other disadvantages of existing regulators, the regulator circuit of the present invention monitors the terminal voltage of the storage battery, and, when necessary, sheds or reinserts portions of the photovoltaic array to the charging system.

SUMMARY OF THE INVENTION

A voltage regulator for controlling the photovoltaic charging of storage batteries selectively includes or sheds portions of the photovoltaic array to provide appropriate charging voltage to the storage batteries. The photovoltaic array is electrically subdivided into subarrays or strings. When the monitored terminal voltage of the storage battery exceeds a predetermined value, subarrays or strings are sequentially removed from the charging circuit until the appropriate charging potential is restored. Conversely, when the battery terminal voltage falls below a predetermined level, formerly shedded strings are re-included into the charging system.

BRIEF DESCRIPTION OF THE DRAWINGS

In the drawings where identical components bear common designation.

DETAILED DESCRIPTION OF THE INVENTION

Figure 1:
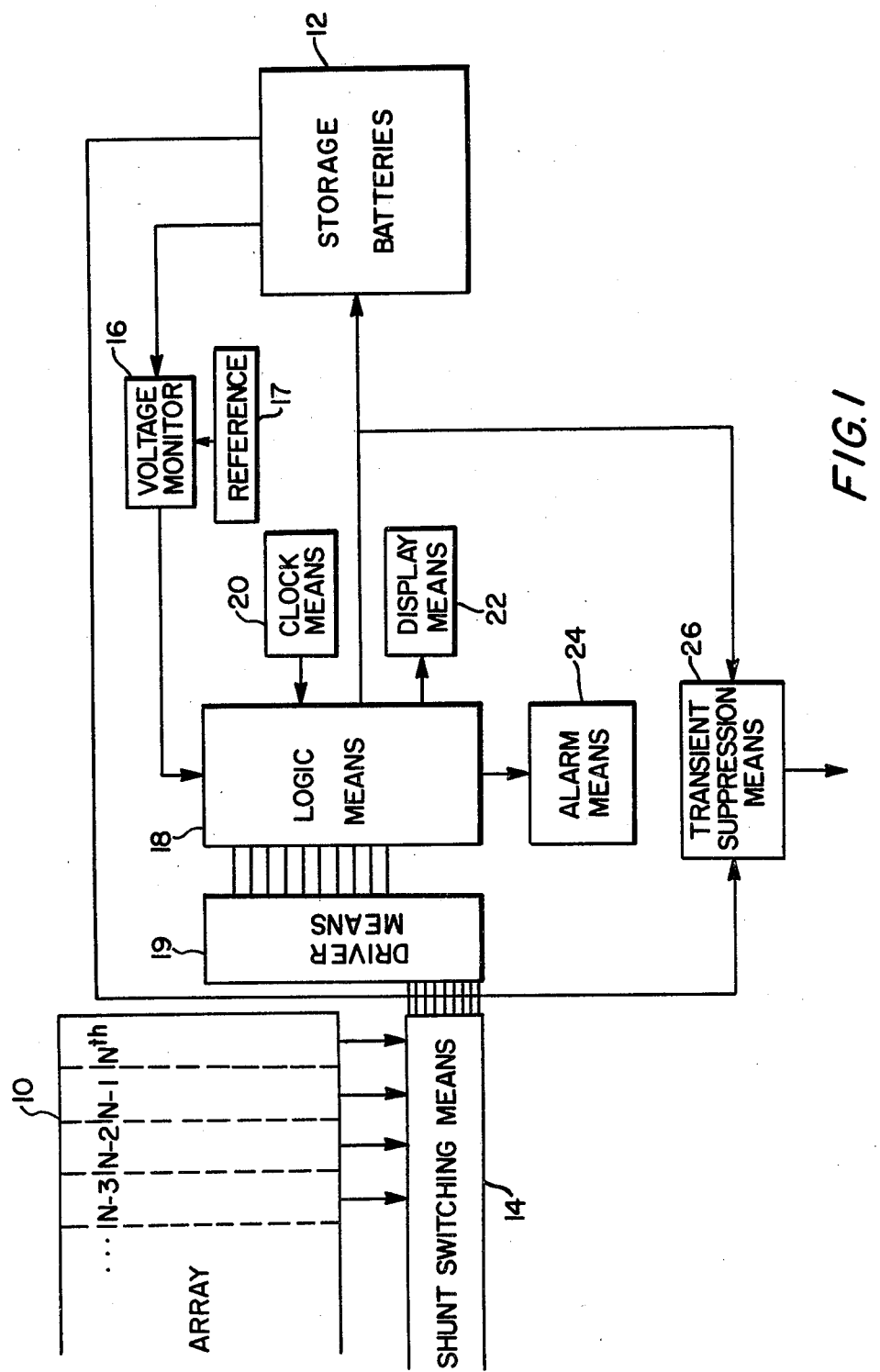
FIG. 1 is a block diagram illustrating, in functional form, components of the present invention.

In accordance with the teaching of the present invention, FIG. 1 illustrates, in block diagram form, the functional components of the present invention. A photovoltaic array 10 is electrically subdivided into first through nth subarrays or strings illustrated in part in the drawing. The array may comprise any suitably arranged plurality of parallel and/or series parallel connected solar cells. For ease of illustration, an array of silicon solar cells will be used throughout the specification, the array having parallel coupled strings, each string having x number of serially connected silicon solar cells. The terms "shedding" or subdividing are used herein to denote the electrical disabling of a designated portion of the array from providing photovoltaic charging power to the battery charging system. The particular number of strings or subdivisions of array 10, n, as well as the number of solar cells in each string, x is dependent upon the intended application and suitable modifications may be made to the individual components of the present invention to facilitate its application to varied photovoltaic recharging systems.

Figure 2:
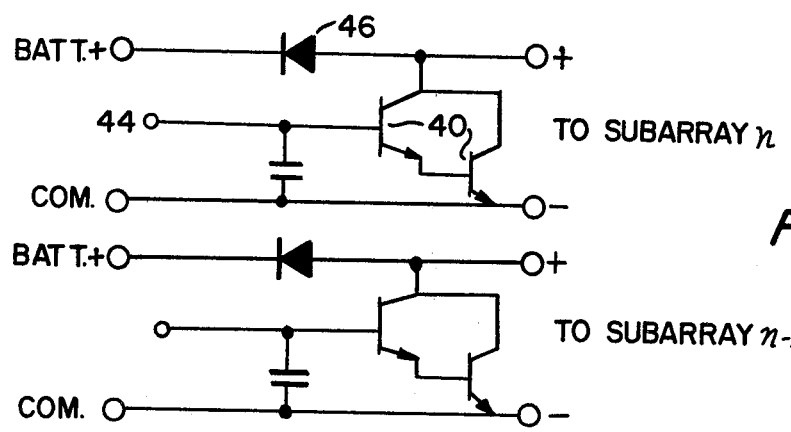
FIG. 2 is a schematic illustration of two of the shunt switching circuits.

Shunt switching means 14 comprises a plurality of switching transistors arranged to independently provide electrical shunting capability across each of the strings of the array. Referring momentarily to FIG. 2, there is shown two of the n shunt switching circuits of the present invention. As illustrated, Darlington switching transistors 40 here shown as NPN bipolar transistors, have their main current conduction path coupled in parallel with the array subdivision (here shown as + and − terminals). In a conducting mode, the Darlington transistor switch provides a low impedance electrical shunting path across the respective array string.

A blocking diode 46 prevents current generated in the remainder of the array from flowing through the shedded portion of the array or the switching means. As noted heretofore, the shedding or reinserting of strings to the array's charging capability is in response to the terminal voltage of the storage battery 12. A Voltage Monitoring means 16 compares the battery terminal voltage to a predetermined reference potential 17. Determination of the reference potential is generally based upon the charging characteristics of the storage batteries. For example, conventional lead-acid storage batteries exhibit a nominal recharging potential of about 2.4 volts per cell. A six-cell lead-acid storage battery would require a nominal recharging potential of about 14.4 volts. The normal charge reference potential $V_{normal}$ would be set accordingly. Means for providing the reference potential, collectively illustrated in FIG. 3 at 50, may comprise a relatively simple arrangement of a monolithic regulator integrated circuit. This regulator IC used in this circuit has a built-in reference source and an operational amplifier. In this invention, the built-in operational amplifier is hooked-up as a voltage follower of the built-in reference source to give enhanced output current capability. In one embodiment, a temperature compensated reference voltage automatically adjusts the reference potential to compensate for the temperature dependent variation in the normal recharging potential of conventional storage batteries.

Figure 3:
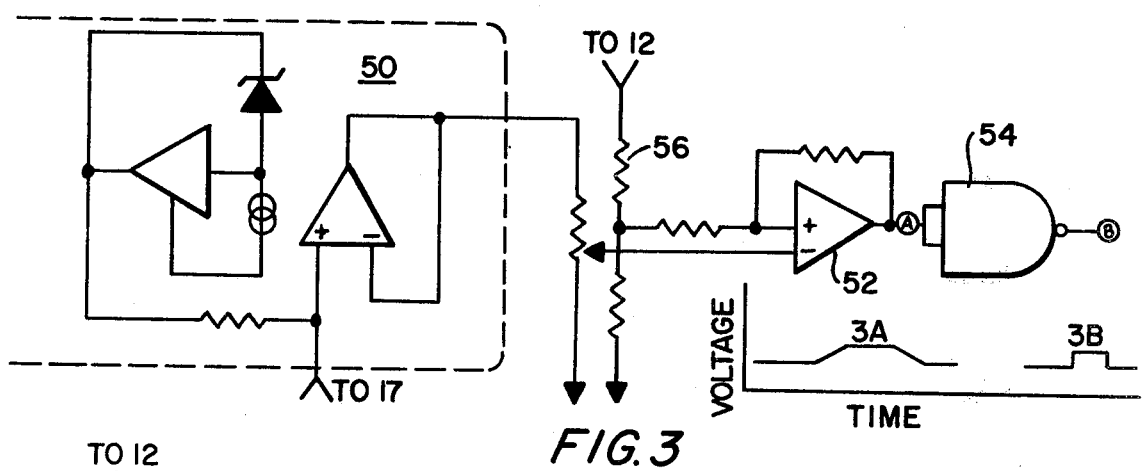
FIG. 3 is a schematic illustration of the $V_{normal}$ section of the Voltage Monitor and pulse shaping circuitry of the present invention.

In a preferred embodiment, the voltage monitor comprises an operational amplifier, suitably coupled to compare the battery terminal voltage with the reference voltage. As illustrated in FIG. 3, one input terminal of operational amplifier 52 is connected to monitor the battery voltage; the remaining input is coupled to the reference potential. These signals are compared and an output signal, proportional to the difference between the reference and battery signal, is provided. Typically the signal rise or fall is slow. To convert this type of signal into a useful switching or logic control signal, a Schmitt trigger 54, is coupled to the output of the comparator. An exemplary battery/reference voltage differential signal and its corresponding shaped signal are shown at FIGS. 3a and 3b, respectively.

Voltage monitoring means 16 further comprises $V_{max}$ and $V_{min}$ detection circuitry which is responsive to battery terminal voltages exceeding a predetermined upper limit ($V_{max}$) and being below a threshold voltage ($V_{min}$). The circuitry comprising these portions of the voltage monitor, is substantially similar to that described for FIG. 3. For a typical lead-acid battery system, $V_{max}$ will be approximately 2.5 volts/cell, whereas, $V_{minimum}$ may vary to facilitate user needs.

Figure 4:
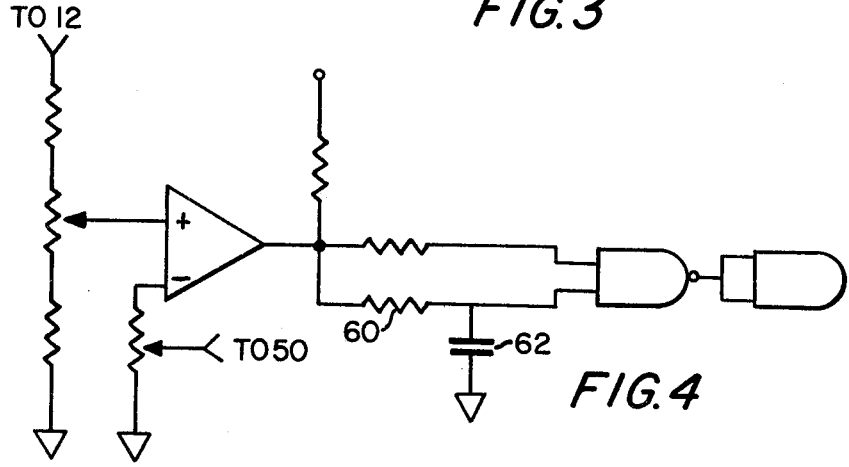
FIG. 4 is a schematic illustration of the $V_{max}$ section of the Voltage Monitor and pulse shaping circuitry of the present invention.

In a preferred embodiment, the maximum battery voltage monitor, $V_{max}$, (and minimum voltage monitor $V_{min}$) includes a time delay circuit, illustrated in FIG. 4, which prevents false triggering of array shutdown, discussed hereinafter.

The maximum voltage monitor and the minimum voltage monitor is designed to give a time delay, typically 200 milli-seconds, to avoid false response due to the battery terminal voltage spike which can be caused by a lightning surge or any other natural transient surge. Thus the logic means 18 will shed array output or reinserting array output after the time delay to make sure that the battery terminal voltage change is real.

Figure 5:
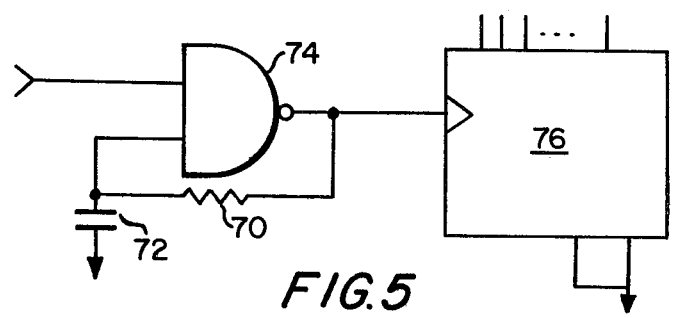
FIG. 5 is a schematic illustration of the clock circuitry of the present invention.

The shaped output of each of the respective voltage monitor segments is coupled to an output of logic means 18. Functionally described, logic means 18 is responsive to each of three battery terminal voltage condition signals provided by voltage monitor 16. In response to a monitored battery terminal voltage equal to or above about $V_{normal}$, logic means 18 provides a control signal to initiate the sequential shedding of a sufficient number of first through nth strings of the array. In response to a monitored battery terminal voltage below normal logic means 18 provides a control signal to initiate the reinsertion of the shedded array strings back into the photovoltaic recharging system. Both the shedding and re-insertion of array strings continue until the opposing battery voltage condition occurs. That is, sequential shedding of array strings will continue until the battery terminal voltage is below about $V_{min}$ where after shedded strings will be sequentially reinserted into the battery charging system until a battery terminal voltage of $V_{normal}$ is attained. Sequencing or timing of the shedding/re-inserting is predetermined and variable. Timing is provided by clock means 20, comprising an astable multivibrator as schematically set forth in FIG. 5. The clock used in this invention is a self-starting astable multivibrator including a resistor 70 and a capacitor 72 and a Schmitt Trigger Nand gate IC 74. The basical period of the clock frequency is determined by the RC time constant. The output of the astable multivibrator is fed into a 12-stage binary counter/divider 76 to provide 12 different user-selectable clock periods.

According to one aspect of the present invention, whenever the monitored battery terminal voltage exceeds $V_{max}$ for a predetermined time period, logic means 18 provides an override control signal to provide for simultaneous shedding of the entire photovoltaic array. Furthermore, whenever the monitored battery terminal voltage is less than $V_{min}$ for a predetermined time period, logic means 18 provides an override control signal to provide for simultaneous re-inserting of the entire array. The period of time delay is controlled by the values selected for resistor 60 and capacitor 62.

In one embodiment, logic means 18 comprises a 16-stage binary up/down counter, which, in conjunction with driver means 19, decodes the control signals and drives the appropriate control gates and/or switching transistors to provide the controlled shedding/re-inserting of the array strings.

The aforementioned control circuitry comprises a precision voltage reference, voltage monitors, clock and 16-stage up/down binary counter. The direction of the up/down counter is controlled by Schmidt trigger 54 in response to the battery voltage. The up/down counter outputs are fed into a particularly adapted decoder section. The decoder section consists of 4 to 10 cumulative decoder, reset, programmable hold and control override circuits. The 4 to 10 cumulative decoder comprises a plurality of NOR and NAND gate integrated circuits. There are 16 possible combinations of the up/down counter; all combinations are used to shed or reinsert array output and 5 combinations are used to reset the counter. When the switching regulator is connected to the solar array system, the counter output status may be any one of 16 possible combinations. If the initial counter output happens to be one of the 5 reset status, the decoder automatically resets the counter and starts from the very beginning. As the counter advances (counts up), 10 decoder output lines cumulatively become active and start to shed array output one at a time sequentially. When the counter counts down the decoder starts to reinsert array output one at a time. The programmable hold circuit enables user to program the exact number of logic sequences to avoid unnecessary waiting periods. Each of the 10 decoder lines has a driver transistor to turn on or off the Darlington transistor switch.

For user convenience, display means 22 includes visual indication of the shedding/re-insertion of the array strings. Alarm means 24 may also be included to provide visual and/or audio indication of a monitored battery terminal voltage at/or above $V_{max}$.

In a preferred embodiment, transient suppression means 26 is interposed between the storage batteries and shunt switching means 14 voltage spikes.

Also, for user convenience and for testing the system performance, a test circuitry is provided in this sequential switching regulator. One push of a test button starts a automatic test sequence, inserting only one array output at a given period from the first array to the last th array, which enables user to measure individual array output charging current and driver and switching stage test.

Also, five function LCD meter is provided to measure the normal charging voltage, $V_{normal}$, maximum voltage $V_{max}$. Minimum voltage, $V_{min}$. Battery voltage and array charging current. This meter allows both easy settability of voltage trip levels and monitering of the photovoltaic system's performance.

What is claimed is:

1. A voltage regulator system for controlling photovoltaic charging of rechargeable storage batteries, said system comprising:
   an array of photovoltaic solar cells having x number of serially connected solar cells coupled in first through nth parallel connected strings, each said string having blocking diode means connected in series with each of said strings, coupled between said string and said storage batteries;

voltage monitor means responsive to a voltage across said storage batteries, said monitor providing first, second, third and fourth control signals corresponding to monitored battery voltages of
a. greater than or equal to $V_{normal}$;
b. less than or equal to $V_{normal}$;
c. greater than or equal to $V_{maximum}$; and
d. less than or equal to $V_{minimum}$, respectively;

logic means, coupled to receive said first through third control signals, wherein response to said first control signal said logic means provides a first logic signal to initiate a sequential shedding of first through nth strings of said array, said first logic signal continuing until said monitoring battery voltage is less than about $V_{normal}$; and in response to said second control signal, said logic means provides a second level signal to initiate sequential re-inserting of array strings, said second logic signal continuing until the monitored battery voltage equals or exceeds $V_{normal}$; and in response to said third signal continuing for a predetermined time period RC, said logic means provides a third logic signal to initiate simultaneous shedding of first through nth array, strings, said third logic signal continuing until said monitored battery voltage is less than $V_{maximum}$;

in response to said fourth signal continuing for a predetermined time period RC, said logic means provides a fourth logic signal to initiate simultaneous reinserting of first through nth array, strings, said fourth logic signal continuing until said monitored battery voltage is greater than $V_{minimum}$;

switching means for each of said first through nth strings of said array, said switching means having a main current conduction path coupled to electrically disable each respective array string;

sequencing and driver means for providing sequential turn-on or turn-off signals to said first through th switching means, said sequencing means being responsive to said first logic signal to provide sequential turn-on signals to said switching means and responsive to said second logic signal to provide sequented turn-off signals to said switching means;

override and driver means for providing simultaneous turn on or turn off signals of first through nth switching means, said override being responsive to said third and fourth logic signals, respectively.

2. The regulator system for claim 1 wherein said photovoltaic solar cells comprise silicon solar cells.

3. The regulator system of claim 2 wherein said storage batteries comprise lead-acid batteries having number of cells per battery.

4. The regulator system of claim 3 wherein $V_{normal}$ is equal to about 1 times 2.4 volts.

5. The regulator system of claim 4 wherein $V_{maximum}$ is equal to about 1 times 2.5 volts.

6. The regulator system of claim 5 wherein $V_{minimum}$ is equal to about 1 times 2.2 volts.

7. The regulator system of claim 1 wherein said switching means comprise bipolar switching transistors.

8. The regulator system of claim 7 wherein said switching transistors comprise Darlington switching transistors.

9. The regulator system of claim 1 wherein said sequencing means comprises a multi-stage, clock-driven switching register, said clock means providing variable rate sequencing of said shedding or re-inserting of said strings of the array.

10. The regulator system of claim 1 wherein said voltage monitoring means comprises:
   a first comparator means having a predetermined reference voltage of about $V_{normal}$ volts;
   a second comparator means having a predetermined reference voltage of about $V_{minimum}$ volts;
   a third comparator means having a predetermined reference voltage of about $V_{maximum}$ volts; each said comparator means being coupled to compare the battery terminal voltage to the respective reference voltage and providing a signal corresponding to a differential between said battery voltage and said respective reference voltage.

11. The regulator system of claim 10 wherein said comparator means comprises an operational amplifier having an input coupled to a positive terminal of said storage batteries and a second input coupled to said reference voltage.

12. The regulator system of claim 11 wherein said reference voltages comprises a regulator integrated circuit as a voltage follower of built-in reference.

13. The regulator system of claim 10 wherein said comparator means further includes pulse shaping means for converting a slow rise/fall time signal into a rapid rise/fall time signal.

14. The regulator system of claim 13 wherein said pulse shaping means comprises a Schmitt trigger.

* * * * *

UNITED STATES PATENT AND TRADEMARK OFFICE
CERTIFICATE OF CORRECTION

PATENT NO. : 4,327,318

DATED : April 27, 1982

INVENTOR(S) : Yiduk Kwon and Paul Lawson

It is certified that error appears in the above—identified patent and that said Letters Patent is hereby corrected as shown below:

In claim 1, column 5, line 14, delete "third" and substitute -- fourth --, therefor. Line 42, insert -- n -- before the character "th".

In claim 3, column 6, line 6, after the word "having" insert the letter -- y --.

In column 4, line 53, of the specification, before the character "th" insert the letter -- n --.

Signed and Sealed this

Ninth Day of November 1982

[SEAL]

Attest:

Attesting Officer

GERALD J. MOSSINGHOFF

Commissioner of Patents and Trademarks